(12) United States Patent
Green (10) Patent No.: US 11,040,305 B2
(45) Date of Patent: Jun. 22, 2021

(54) APPARATUS AND METHOD FOR ELIMINATING HYDROGEN SULFIDE, IRON SULFIDE, AND OTHER SULFHYDRYL COMPOUNDS FROM GAS AND/OR LIQUIDS

(71) Applicant: Michael Green, Pacheco, CA (US)

(72) Inventor: Michael Green, Pacheco, CA (US)

(73) Assignee: Michael Green, Pacheco, CA (US)

( * ) Notice: Subject to any disclaimer, the term of this patent is extended or adjusted under 35 U.S.C. 154(b) by 532 days.

(21) Appl. No.: 15/910,133

(22) Filed: Mar. 2, 2018

(65) Prior Publication Data
US 2018/0264401 A1    Sep. 20, 2018

Related U.S. Application Data

(60) Provisional application No. 62/601,339, filed on Mar. 20, 2017.

(51) Int. Cl.
*C02F 1/46* (2006.01)
*B01D 53/32* (2006.01)
(Continued)

(52) U.S. Cl.
CPC .......... *B01D 53/326* (2013.01); *C02F 1/4674* (2013.01); *C02F 1/46109* (2013.01); *C10L 3/101* (2013.01); *C10L 3/103* (2013.01); *B01D 2256/245* (2013.01); *B01D 2257/304* (2013.01); *C02F 2001/46142* (2013.01);
(Continued)

(58) Field of Classification Search
CPC ............ B01D 53/326; B01D 2257/304; B01D 2256/245; C02F 1/4674; C02F 1/46109; C02F 2101/203; C02F 2201/003; C02F 2303/04; C02F 2103/10; C02F 2001/46142; C02F 2001/46171; C02F 2101/101; C10L 3/103; C10L 3/101; C10L 2290/38
See application file for complete search history.

(56) References Cited

U.S. PATENT DOCUMENTS 8,663,471 B1 *  3/2014  Barry .................. C02F 1/46109
                                                              210/243

FOREIGN PATENT DOCUMENTS

GB           2 391 018      *   1/2004

* cited by examiner

*Primary Examiner* — Arun S Phasge
(74) *Attorney, Agent, or Firm* — Polsinelli PC (57) ABSTRACT

An apparatus that functions as an influent multiple passage reactor adaptable to simultaneously carry out a series of functions including effluent contaminant dissociation and molecular oxidation utilizing electrolytic and catalytic reactions is disclosed. The apparatus comprises a concentric outside that may be constructed of an electrically conductive material to serve as a first electrode. A smaller second concentric electrode mounted inside the outside housing may serve as a first cathode, with a third but smaller concentric electrode mounted inside the first cathode serving as a second anode, with yet a fourth but even smaller concentric electrode mounted inside the second anode serving as a second cathode and thereof (with additional anode/cathodes further included as desired). Between each electrode an influent passageway is formed with the series of electrodes and passageways stabilized by two slotted end caps which also serve to seal the apparatus housing. When DC current is supplied from a power source to a corresponding influent containing sodium chloride, reactive oxygen and chloride species are produced.

18 Claims, 5 Drawing Sheets

(51) Int. Cl.
   *C02F 1/467* (2006.01)
   *C02F 1/461* (2006.01)
   *C10L 3/10* (2006.01)
   *C02F 103/10* (2006.01)
   *C02F 101/10* (2006.01)
   *C02F 101/20* (2006.01)

(52) U.S. Cl.
   CPC ............... *C02F 2001/46171* (2013.01); *C02F 2101/101* (2013.01); *C02F 2101/203* (2013.01); *C02F 2103/10* (2013.01); *C02F 2201/003* (2013.01); *C02F 2303/04* (2013.01); *C10L 2290/38* (2013.01)

APPARATUS AND METHOD FOR ELIMINATING HYDROGEN SULFIDE, IRON SULFIDE, AND OTHER SULFHYDRYL COMPOUNDS FROM GAS AND/OR LIQUIDS

FIELD OF THE INVENTION

The invention relates to a method and apparatus for the prevention and remediation of $H_2S$, FeS and other related sulfhydryl compounds such as Thiol or Organosulfur or Ferrous Sulfide, (Iron II) found in liquid or gas streams.

BACKGROUND OF THE INVENTION

Sulfide exists in wastewater in three forms; hydrogen sulfide gas ($H_2S$), non-volatile ionic species hydrogen sulfide (HS—) and sulfide ($S^2$—). The ratio of each of the three species $H_2S$, HS— and $S^2$— varies depending on pH. At pH 6, ninety percent of the sulfide is presented as $H_2S$ and with the higher concentration has greater tendency to volatilize, conversely at pH 10, one hundred percent of the sulfide will be present as stable and undetectable.

The prevention, removal and remediation of hydrogen sulfide ($H_2S$), iron sulfide, (FeS) and other sulfhydryl compounds from liquid or gas streams is a challenge within a wide range of industries. The presence of $H_2S$ poses significant environmental and safety concerns to personnel and operators due in part to the fact that $H_2S$ is highly flammable, highly toxic and when inhaled, (8 hours of exposure @ 100 ppm) has been reported to cause death. $H_2S$ is also highly corrosive and malodorous with scale deposits often resulting from the presence of iron sulfide when in contact with metallic surfaces, such as in carbon steel pipes which can plug and restrict pipeline flow rates.

Iron sulfides occur widely in nature in the form of iron sulfur proteins and as organic matter that decays under low-oxygen or hypoxic conditions. This typically happens in swamps, and dead zones in lakes and oceans when sulfate-reducing bacteria are present to produce hydrogen sulfide. Some of the hydrogen sulfide reacts with metal ions in the water or solids to produce metal sulfides, which may not be water-soluble. These metal sulfides such as iron (II) sulfide are often black or brown and create sludge.

Iron can be responsible for a variety of aesthetic problems such as elevated color in finished water and although chlorine and permanganate will not oxidize manganese from solution, neither permanganate nor chlorine will reliably remove organically bound iron. However, chlorine dioxide is a known oxidizer that has been proven to quickly and reliably remove iron and organically bound iron to below 0.02 ppm. For each ppm of iron approximately 1.2 ppm of chlorine dioxide is required to oxidize Fe from solution.

In the oil and gas industry, the removal of $H_2S$ and FeS is of extreme importance for the transport and storage of crude reserves as well as meeting standards for downstream refining. Removal is important to prevent the cracking catalysts used during the refining process and in the transmission of natural gas. Further, in both the refining industry and geothermal power industry, cooling tower process water often contains moderate to high levels of $H_2S$ causing significant solid development within internal structures.

Nonetheless, the challenge of reducing and/or removing $H_2S$ and FeS from process streams has been addressed by a variety of different technologies. Common techniques utilize either absorption sulfides using solvents or with solid phase materials known to produce corresponding reaction products which involve the reaction of $H_2S$ with various types of aldehydes. For instance, U.S. Pat. No. 1,991,765 is an early example describing the reaction of formaldehyde with hydrogen sulfide to form an insoluble product, later identified as the sulfur heterocycle 1,3,5-trithiane.

U.S. Pat. No. 7,438,877 discloses a method for $H_2S$ removal utilizing mixed triazine derivatives for improved scavenging. The mixture improves the overall scavenging capacity of triazines, but whether complete removal is achievable for a theoretically stoichiometric amount is not reported.

Another apparatus known to the applicant is that of Westerlund as disclosed in U.S. Pat. No. 3,502,443 which discloses a chlorine dioxide generating system as does in the Fuller et al. U.S. Pat. No. 3,816,077, which involves the employment of sodium chlorate, sodium chloride and acid for the production of chlorine dioxide.

Various types of chlorine dioxide generators have been proposed, most of which comprise elongated glass or plastic columns of various constructions. See, e.g., U.S. Pat. No. 4,013,761, issued to Olin Mathieson.

U.S. Pat. No. 7,604,720 B2 discloses an on-site electro-chemical based membrane cell to produce sodium hypochlorite and or elemental chlorine gas for water disinfection.

While multiple methods have been developed for water disinfection and the scavenging of $H_2S$, FeS and sulfhydryl compounds from industrial processes, a low cost, high capacity and fast reacting alternative utilizing a waste stream to control, reduce sulfide species or too mitigate the microbiological source would be a desirable technology.

This type of technology would also be particularly desirable to the petroleum industry where an abundant waste stream could be utilized to produce chlorine dioxide for the treatment of $H_2S$, FeS and the biological source in lieu of having to purchase and store chemicals, and would eliminate the labor required in batching the chemicals for treatment.

Sodium chloride, (NaCl) is commonly found globally in petroleum produced or flow back wastewater which can be electrically catalyzed to produce oxygen, ($O_3$) and chlorine reactive species such as Cl, $ClO_2$ and $H_2O_2$.

Using the existing sodium chloride found in produced or flowback water can be catalyzed through an electro-catalytic process utilizing mixed metal oxides which are known to produce chlorine and oxygen reactive species such as $ClO_2$; $NaClO_2 + \frac{1}{2}Cl_2 \rightarrow ClO_2 + NaCl$.

Chlorine dioxide, ($ClO_2$) is commonly used in oil fields to stimulate formation production due fowling or plugging caused by FeS deposits and to reduce $H_2S$ corrosiveness. Unlike alternative chemical technologies, chlorine dioxide is a true gas that is a relatively stable oxidant that reacts only with reduced compounds such as sulfides, phenols and biomass with $ClO_2$ also known to stay in solution for between 24 and 48 hours.

Chlorine dioxide's unique chemical and physical properties make it ideal for use in treatment of stored fracturing fluids. As an oxidant, it's able to penetrate hydrocarbons and breakup emulsions allowing the separation and recovery of hydrocarbons. Because of its specifics, its oxidation power can be directed at contaminates such as sulfides and residual polymers without the creation of undesirable by-products. Unlike bleach or chlorine, chlorine dioxide does not form chlorination by-products that can cause operational or environmental concerns and unlike ozone and hydrogen peroxide, chlorine dioxide does not break down into oxygen nitrifying the water and promoting subsequent microbial growth.

In oilfield fracturing, typical makeup or flood water dosed with $ClO_2$ would be 100 times lower than the effective dosing of traditional chemicals. The selectivity and mode of action of $ClO_2$ make it uniquely suited to work at low concentrations which provide economic advantages over many traditional chemical treatment programs.

Another object of the present invention is to electrically lyse sulfate-reducing bacteria, (SRB). Lysing is known to compromise the integrity of a microorganism's outer shell or membrane when exposed to an electrical field which often results in irreversible injury or death to the bacteria cell due to environmental or antibiotic stress. See, e.g., Microbial Mol. Biol. Rev., 72(1):85-109 (2008).

SUMMARY OF THE INVENTION

In order to address the need to remediate (prevent, inhibit, and/or reduce) $H_2S$, FeS, etc., and the biological source over a wide pH range, the present invention provides an industrial apparatus that utilizes electro-chemistry to convert sodium chloride into chlorine and oxygen reactive species such as Cl, $ClO_2$ and $H_2O_2$.

Mixed metal oxide (MMO) electrodes are devices with useful properties when used as electrodes during an electrolysis process. MMO electrodes are electrodes in which at least the surface contains a coating of several kinds of metal oxides for example, $RuO_2$, $IrO_2$ or $PtO_2$. These MMO electrodes provide conductivity and catalyzed ion reactions in the production of chlorine and other reactive species from water borne NaCl.

Therefore, it is the objective of the present invention to provide a method and apparatus for the remediation of (prevention, removal, and/or reduction of) $H_2S$ and FeS that is easily implemented into existing pipelines or infrastructures with the system mainly dependent upon wattage verses chemical dosing for sulfhydryl compound treatment and scale deposit remediation and prevention.

In one embodiment, the present disclosure relates to an apparatus for treating gas and/or liquid, the apparatus comprising:
- an outside housing that houses a series of porous, concentric electrode tubes;
- a series of porous, concentric electrode tubes each having a top end and a bottom end, wherein the series of electrode tubes consists of alternating anode and cathode tubes;
- a space between adjacent electrode tubes that allows passage of the gas and/or liquid along the length of the electrode tubes;
- a porous inline electrode tube that forms the center of the series of the electrode tubes;
- a top flange and a bottom flange;
- a top end cap over the top flange and a bottom end cap over the bottom flange;
- an inlet through the bottom end cap and through the bottom flange that is in fluid communication with the inline electrode tube;
- an outlet through the top end cap and through the top flange that is in fluid communication with the inline electrode tube.

In another embodiment, the outside housing for the series of porous concentric tubes serves as a first electrode to the series of porous, concentric electrode tubes. The outside housing may comprise titanium and/or be constructed of titanium. In one embodiment, the outside housing is in the shape of a concentric tube having a top end and a bottom end, consistent with the series of concentric electrode tubes for which is houses.

In another embodiment, the series of porous, concentric electrode tubes are constructed of a conductive mesh, such as a conductive mesh that is coated with or made from titanium, iridium, ruthenium, or a combination thereof. In some instances, one or more of the anode tubes of the series of electrode tubes comprises titanium. Additionally, in some instances, one or more of the cathode tubes of the series of electrode tubes comprise a mixed metal oxide. For example, one or more cathode tubes may be constructed of a titanium mesh that is coated with a mixed metal oxide. In some embodiments it is preferable that the anode tubes comprise titanium or titanium coated mesh and the cathode tubes comprise mixed metal oxide(s) or mixed metal oxide(s) coated mesh. Preferred mixed metal oxides include $RuO_2$, $IrO_2$, $PtO_2$, or a mixture thereof.

The series of electrode tubes are constructed in a progression of varying smaller sizes (small diameters), with the outside housing having the largest diameter.

A space (or a gap) exists between each electrode tube of the series of electrode tubes that allows passage of a gas and/or a liquid along the length of the electrode tubes. The distance between adjacent electrode tubes that forms the space or gap can be from about 1 mm to about 2 meters. In some instances, the distance between adjacent electrode tubes is from about 1 mm to about 1 meter, about 1 mm to about 50 cm, about 1 mm to about 40 cm, about 1 mm to about 30 cm, about 1 mm to about 15 cm, about 1 mm to about 10 cm, about 1 mm to about 5 cm, about 1 mm to about 1 cm. It is understood that the size of the apparatus, the electrode tubes of the apparatus and the distance between adjacent electrode tubes can be scaled from a small apparatus to a large apparatus. Therefore, in some instances, the distance between adjacent electrode tubes may be about 5 cm to about 2 meters, about 10 cm to about 2 meters, about 50 cm to about 2 meters, about 5 cm to about 1 meter, about 10 cm to about 1 meter, about 50 cm to about 1 meter, about 5 cm to about 50 cm, or about 10 cm to about 50 cm. The distance between adjacent electrode tubes can be substantially the same between all adjacent electrode tubes in the series of electrode tubes.

The apparatus includes a porous inline electrode tube that forms the center of the series of the electrode tubes (the center electrode). In one embodiment, the inline electrode tube is a perforated tube with the perforation openings smaller than the openings used on all other electrode tubes in the series of electrode tubes. Having smaller perforations or openings in the inline electrode tube restricts flow through the inline electrode tube compared to flow through the electrode tubes in the series of electrode tubes surrounding the inline electrode tube.

The apparatus of the present disclosure may include a top flange and a bottom flange, wherein the top flange is incorporated into the top of the apparatus and the bottom flange is incorporated into the bottom of the apparatus. In particular, the top flange connects with the top end of the outside housing and the bottom flange connects with the bottom end of the outside housing, for example, the flanges extend radially outward from the perimeter of a concentric outside housing and can be used to interface with the top and bottom endcaps to attached the top and bottom endcaps to the apparatus.

In another embodiment, the top flange and the bottom flange provide mounting for the top endcap and the bottom endcap, which are used to seal the outside housing and its internal components. For example, the top endcap and the bottom endcap can be slotted to receive and retain in place the series of concentric electrode tubes. In particular, the top endcap comprises a series of slots that receive the top end of each of the electrode tubes and the bottom endcap comprises an equivalent series of slots that receive the bottom end of each of the electrode tube, thereby retaining in place the series of electrode tubes such that each of the electrode tubes of the series is substantially parallel to all other electrode tubes of the series. Also, the top endcap and the bottom endcap can serve as electrical isolators between the outside housing and the internal series of concentric electrode tubes. Therefore the top endcap and/or the bottom endcap can be made of insulative material. In one embodiment, the top endcap and/or bottom endcap are made of acrylonitrile butadiene styrene (ABS) or polyvinyl chloride (PVC).

In one embodiment, the top endcap and/or the bottom endcap includes one or more passageways, for example, one or more holes, for securing an electrical connection to each of the electrode tubes. In another embodiment, the electrode connection point extends beyond the outer surface area of the endcaps with these points used for electrical connection to a DC power source. In an embodiment described above, the endcaps include inlets and outlets. The inlet(s) and the outlet(s) can alternatively (or additionally) be included through the outside housing.

In another embodiment, a DC power source is used to distribute electrical current to the electrodes of the apparatus. The series of electrodes serve as anodes and cathodes in which either positive or negative current is passed to and from the power source.

In one embodiment, the apparatus further comprises one or more gaskets between the top flange and the top end cap and one or more gaskets between the bottom flange and bottom end cap.

In one embodiment, each of the electrode tubes in the series of electrode tubes are essentially cylindrical. In other embodiments, each of the electrode tubes in the series of electrode tubes are essentially oval, essentially star shaped, essentially square shaped, etc.

In one embodiment, the bottom endcap and/or the top endcap include a secondary outlet coupled to a pressure relief valve for alleviating pressure build up in the apparatus. The pressure relief valve may optionally be in communication with a carbon filter for noxious or toxic gas capture.

The apparatus of the disclosure is useful in methods for treating gas and/or liquids and in particular for preventing, removing, and/or reducing the amount of sulfhydryl compounds in a gas and/or liquid. The method comprises feeding a gas and/or liquid comprising sulfhydryl compounds into the inlet of the apparatus of the present disclosure, and applying a power source to the apparatus. When a power source is applied, the apparatus removes the sulfhydryl compounds from the gas and/or liquid.

In one embodiment, the gas and/or liquid (influent) that is fed into the apparatus includes sodium chloride (NaCl), which results in the formation of chloride dioxide and reactive oxygen species (e.g., ozone, $H_2O_2$, etc.), which help break down sulfhydryl compounds. Chemically, through the use of electro-chemical electrolysis NaCl disassociates (it only takes 1.24 v to disassociate the water compound and likewise with chloride compounds). The chloride once exposed to mixed metal oxide, (MMO) electrodes, (anodes) is catalyzed to produce reactive chlorine species whereas, the cathodes produce reactive oxygen species.

Many sulfhydryl compounds are produced by Sulfur Reducing Bacteria, (SRB) when after dying due to cellular oxidization produce $H_2S$. When the gas and/or liquid (influent) having bacteria transits through the apparatus, exposure to an electrical current causes lysing of their outer shell. Furthermore, exposure to Cl, $ClO_2$ and $O_3$, $H_2O_2$ in the apparatus also kills the SRB.

In one embodiment the gas and/or liquid (influent) is petroleum wastewater commonly referred to as "produced water" or "flood water." In general each barrel of crude extracted is accompanied by anywhere from 3 to 15 barrels of wastewater. This wastewater is often pumped back into an oil or frack well, or is used to flood a frack well. In either case, before going into a well or formation, the water is disinfected of bacteria to prevent $H_2S$, ($H_2S$ sours crude and natural gas which reduces value). Thus, in one embodiment, the methods of the present disclosure relate to preventing or reducing the souring of crude and/or natural gas.

In another embodiment, the arriving influent containing sodium chloride is electrically catalyzed to produce reactive oxygen and chlorine species using a series of mixed metal oxide coated cathodes.

In another embodiment, the present invention is installed within an existing flood pipeline leading into an oil formation that may be susceptible to petroleum or natural gas souring due to sulfhydryl compounds.

In another embodiment, the present invention is scalable to allow high influent flow rates and can be positioned to work in series or parallel alongside of other similar apparatus.

In another embodiment, the present invention remediates SRB (sulfate reducing bacteria) colonies and other slim forming microorganisms in transiting influent utilizing electrical cellular lysing.

DETAIL DESCRIPTION OF THE DRAWINGS

Described herein are systems and methods for the production of reactive oxygen and chlorine species utilizing a multiple electrode and passageway apparatus adaptable to simultaneously carry out a series of functions.

Figure 1:
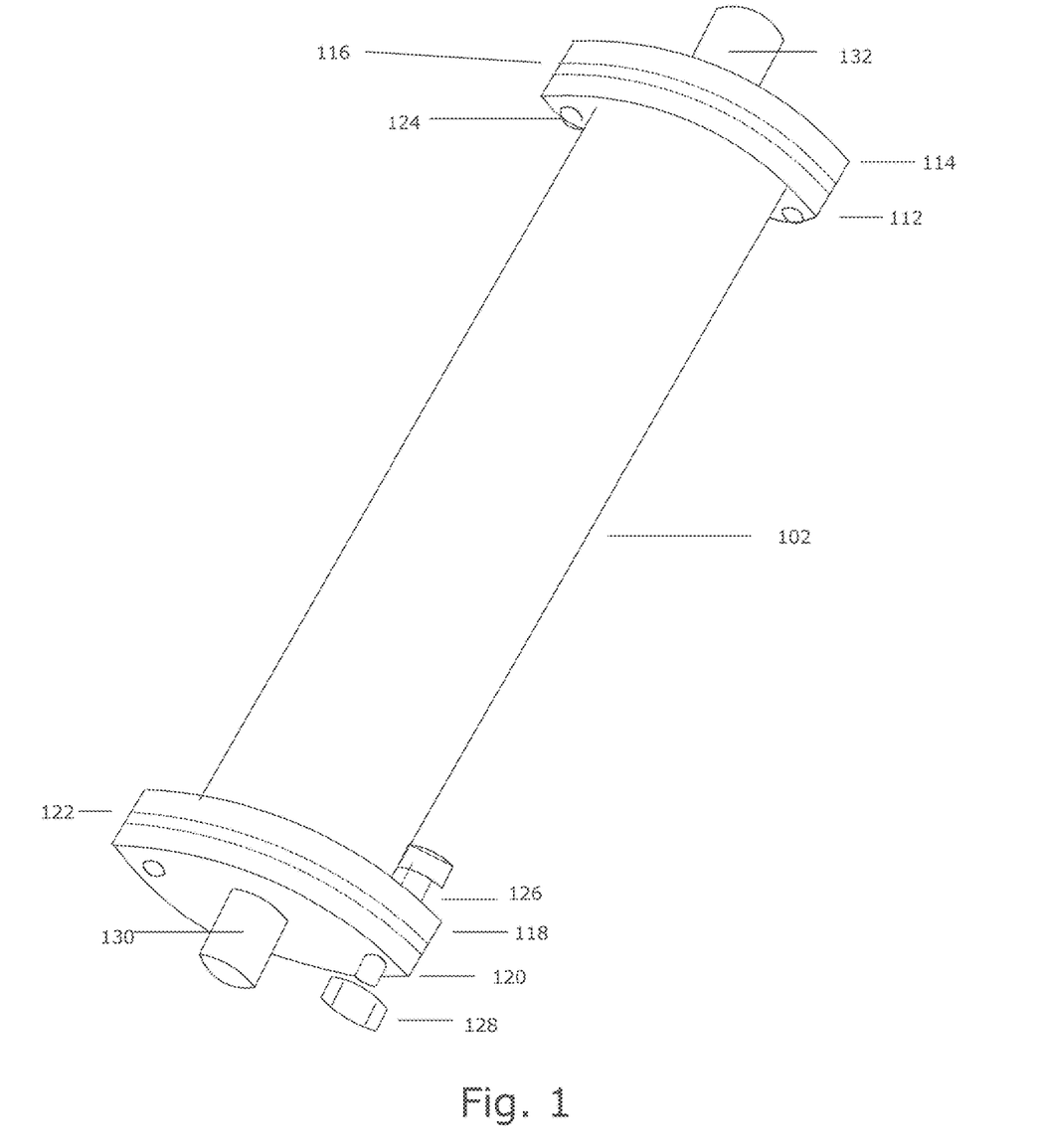
FIG. 1: illustrates a perspective outside view and the configuration of the outside housing and its exterior components.

The present invention explanation begins with FIG. 1 and where an electrolytic reactor consists of a concentric or tubular outside housing 102 constructed of an electrical conductive material with this outside tube also serving as a first electrode, or as related to the present invention, a first uncoated anode. In the preferred embodiment, the outside tube 102 is constructed of uncoated titanium which is electrically conductive while also being corrosion resistance as demonstrated recently during a field test. Field testing showed the titanium tubular housing was deterrent to mineral or scale buildup.

The diameter of the outside tube 102 is scalable and can be constructed in various diameters and lengths ranging from one to sixty inches in diameter and up to twenty feet tall to accommodate a desirable influent flow rate and whereby, the tubular housing 102 can be positioned to work in series or in parallel with other housings as dictated by an individual flow rate or application.

Incorporated as parts of the outside tube 102 are two opposing flanges, with one flange considered a top flange 112 with a second flange considered a bottom flange 118 which are attached to the housing by a weld means or the flanges can be attached by threads. Both flanges incorporate a series of mounting holes 124 which are utilized by a series of fasteners 126 which are used to secure endcaps 114 and 120 to the outside tubular housing with one of the fasteners used to secure an electrical connection to the outside housing.

Placed between each flange and endcap mating surface are gaskets 122 used to provide a water tight seal between adjoining surfaces on flange 112 and 118 and endcaps 114 and 120 when bolted tightly together. The material used for gaskets 122 should be chemical and temperature resistance such as if using neoprene rubber.

Both endcaps 114 and 120 act as isolators and therefore, are require to be constructed of a non-conductive material such as ABS® or PVC® or the endcaps can be constructed of any type of nonconductive materials.

Both endcaps provide an opening for the acceptance and discharge of an influent, inlet 130 allows influent entry while outlet 132 allows the discharge of influent from the housing. The inlet or outlet size is somewhat limited based on the diameter of a last or center electrode. For an example, if the last electrode in the series of electrodes is one inch in diameter then the openings in the endcap must be in compliance to prevent influent bi-passing of the last electrode. However, in applications where the inlet and outlet diameter size are larger due to overall scale of the system, then the inlet and outlet opening sizes can be increased as long as they do not exceed the outside diameter of the last electrode.

Figure 2:
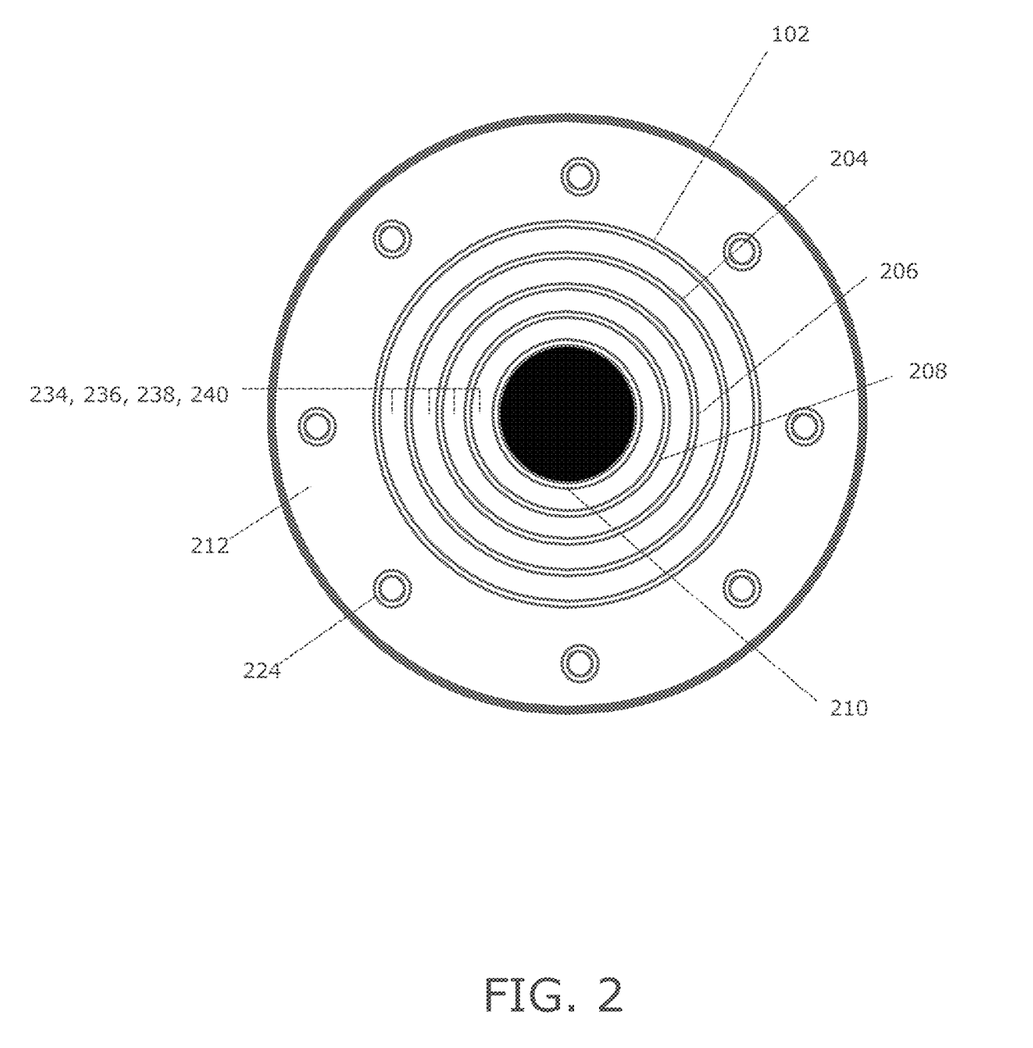
FIG. 2: illustrates a perspective view of the endcaps' slotting arrangement for the formation and configuration of the internal passageways.

FIG. 2 provides a perspective housing end view with an endcap removed, the internal system is composed of a series of internal electrodes and whereas, a second electrode 204 is smaller in size to allow mounting inside the outer housing 102, with this electrode serving as the first coated cathode. This first coated cathode 204 mounts in such to create gap spacing 234 between the first and second electrodes, (102 and 204). This first gap spacing also provides electro isolation between the electrodes pairing with spacing also utilized as an internal passageway 234 for transiting influent.

The second electrode 204 is constructed of titanium mesh coated with ruthenium. Mesh construction allows horizontal influent flow while simultaneously allowing the influent to transit vertically through the housing. This method allows the influent in most cases a longer residence time required to evolve certain electrolytic or catalytic reactions required to produce reactive oxygen or chlorine species used in the remediation of $H_2S$, FeS and also, to aid in the cellular lysing of sulfate-reducing bacteria and other slim forming microorganisms.

A third electrode 206 mounts inside the inner diameter of the first anode 204 and serves as a second anode. This third electrode is constructed of uncoated titanium mesh to once again provide both vertical and horizontal influent flow while transiting through gap spacing 236. Gap spacing 236 is created between electrodes 204 and 206 and also serves as a second vertical passageway for traversing influent.

A forth electrode 208 is mounted inside the inner diameter of the second anode and serves as a second cathode and with this electrode also constructed of ruthenium coated titanium mesh. Gap spacing 238 is created between electrodes 206 and 208 which again serve as the third vertical passageway for transiting influent.

A fifth electrode 210 is mounted inside the inner diameter of the second cathode and serves as a third anode with this electrode also constructed of uncoated titanium however, the last inline electrode in the series is required to restrict vertical and horizontal influent flow prior to exiting the system. The last in line electrode is constructed of perforated tubing instead of mesh with the perforated openings approximately one quarter the size of the openings found in the mesh.

Gap spacing 240 is also created between electrodes 208 and 210 which again serves as a forth passageway for transiting influent.

Gap spacing between each electrode pairing which form's the internal influent passageways can range in size from approximately 0.025 cm to 12.7 cm. These passageways are stabilized by a series of slots located in the end caps. The slots should be interface upwards towards the interior of the housing with the slots equally space a part as to not create an electrical imbalance between the series of electrodes as electric will always follow a path of least resistance. Further, the endcaps also serve to seal the concentric housing and its internal components.

To those skilled in the art, an unlimited number of electrode pairings can be installed to form influent passageways with the number electrode pairings and passageways only limited by the diameter of the outside housing.

Figure 3:
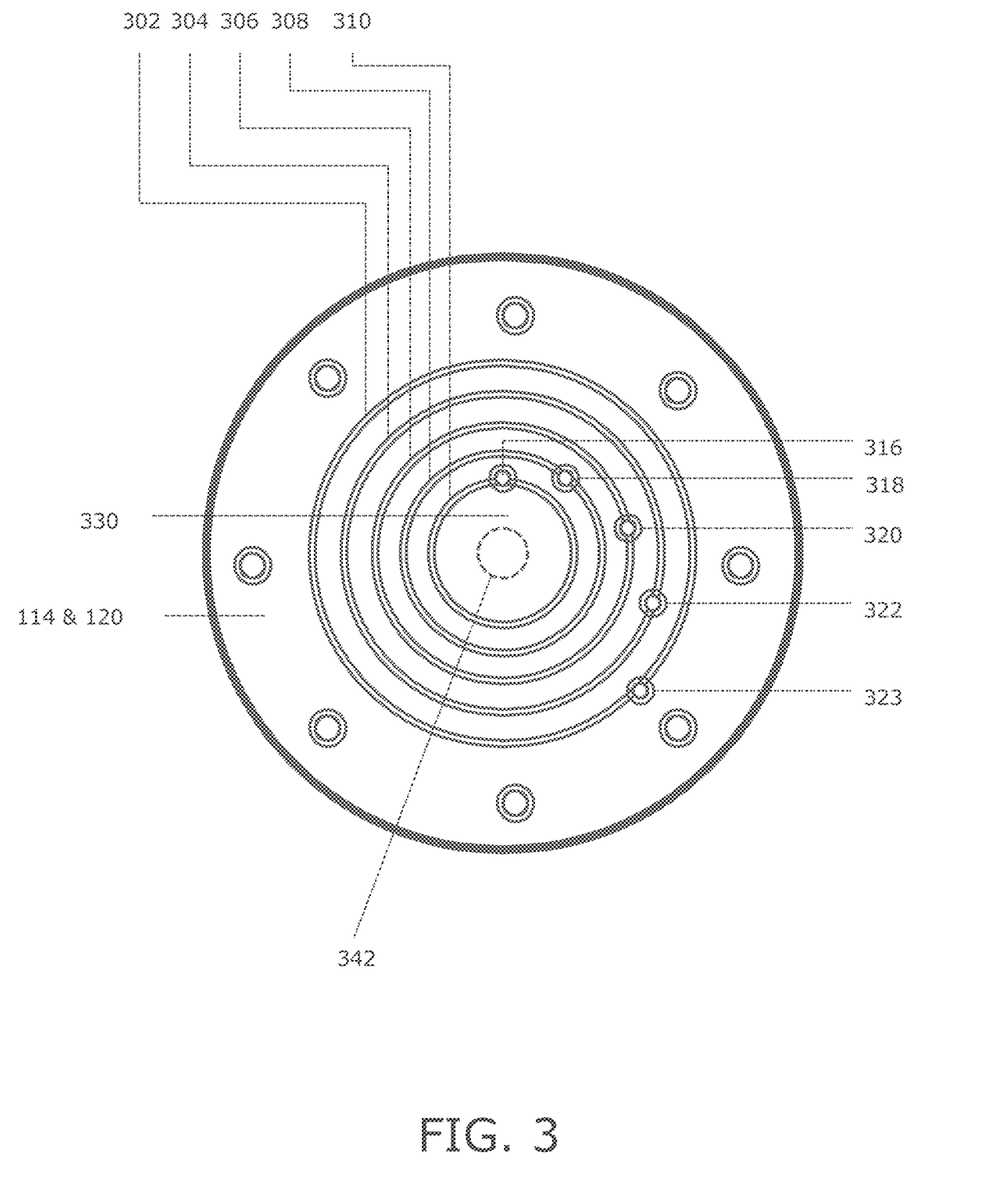
FIG. 3: illustrates an internal perspective view of the internal electrodes, their configuration and placement within the outer concentric housing.

In reference to FIG. 3 which provides a surface perspective view of the end caps and the incorporation of a threaded surface for the mounting of a pressure relief valve, the positioning of the inlet or outlet and the placement of through holes in the endcaps which are utilized to make electrical connection to the electrodes.

Endcaps 114 and 120 provide a series of slots, 302, 304, 306, 308 and 310 which are used to secure the placement of the internal electrodes within the housing.

The slots countersunk into the endcaps should range in depth from between a quarter to around a half inch with the width of the slot depend on the thickness of the electrode material used in order to provide electrode stability once mated to the endcap.

At least one endcap must provide a series of openings, 316, 318, 320, 322 and 323 to allow electrical connections made to the series of internal electrodes. In a preferred embodiment, a thread stud is installed or welded to the internal electrodes in which passes through and extends out passed the exterior surface of the end cap, in such that an electrical connection is easily made to the electrodes.

The endcap located at the top end of the housing provides a threaded opening 342 for the acceptance of a pressure relief valve which is utilized to off-gas hydrogen, oxygen or any other gases generated by the electrolytic reactions. Gasses typically will accumulate at the top of the housing and exit the housing with the discharged influent 330 however; some of the gases trap and eventually start to build pressure within the housing if not evacuated.

In the preferred embodiment, the pressure relief valve is adjustable to allow low pressure settings for gas evacuation with its location positioned such that it mounts inside the diameter of the outer housing.

Figure 4:
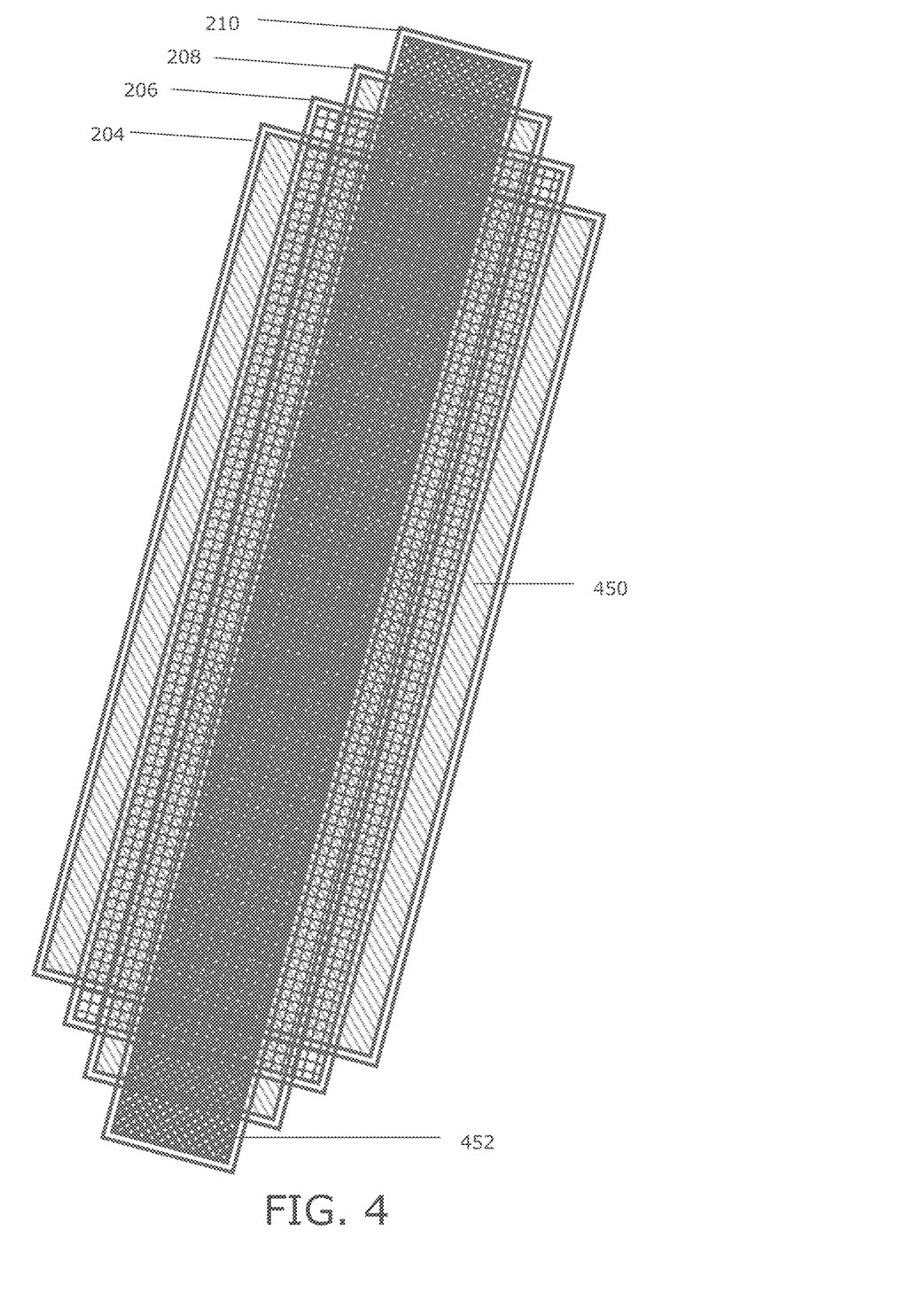
FIG. 4: illustrates and provides a perspective view of the stacking of the electrodes within the outer housing.
Figure 5:
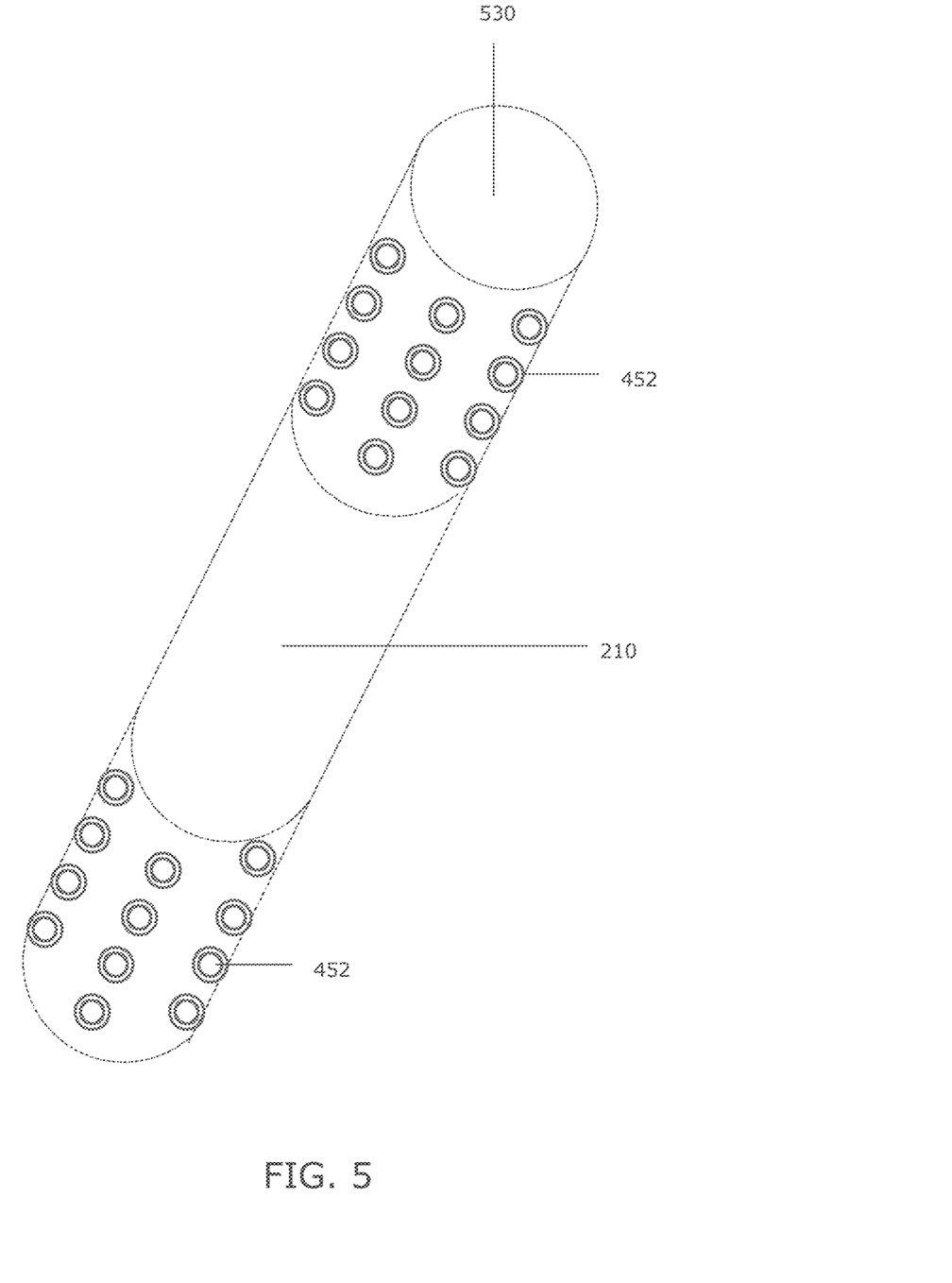
FIG. 5: illustrates and provides a perspective view of the last or center electrode incorporating perforations.

Now in reference to FIGS. 4 and 5 which provides a perspective view of the electrode stacking order once mounted inside the outer housing and the configuration of the last inline or center electrode 210. With the acceptation of the outer housing, electrodes 204, 206 and 208 are constructed from titanium mesh 450 with electrodes 204 and 208 coated with a ruthenium mixed metal oxide coating. Ruthenium is widely used as an electro-catalyst for the production of chlorine, chlorine oxides, and $O_2$.

Electrode 210 should be considered the last inline or the center electrode and is constructed from a titanium perforated tube. The perforation openings 452 are smaller than the mesh size used in the construction of all other electrodes, (204, 206 and 208). The smaller perforated opening on the center electrode helps to restrict the flow of exiting influent and to allow a longer influent residence time for electrical exposure used for the evolvement of electrolytic or catalytic reactions and to lend aid to cellular lysis of sulfate-reducing bacteria and other slim forming microorganisms.

Electrode mesh and the perforated openings can be of any size as long as the center electrode openings are smaller than the outer electrode's mesh sized. However, in the preferred embodiment a mesh size of approximately 0.63 cm is used in conjunction with a perforation opening of around 0.317 cm which was found to provide adequate influent residence while still allowing an acceptable system flow rate.

With emphasize now on FIG. 5 which provides a perspective view of the last inline or center electrode. Electrode 210 provides smaller perforation openings 452 then all other proceeding electrodes. The perforations are once again used to restrict influent outflow to allow the influent a longer duration inside the housing and whereas, the longer the residence time the more efficient are the electro-chemistry reactions.

As the influent migrates through the perforation openings it's then directed to outlet 530 where it exits the system.

What is claimed:

1. An apparatus for treating gas and/or liquid, the apparatus comprising:
   an outside housing that houses a series of porous, concentric electrode tubes;
   a series of porous, concentric electrode tubes each having a top end and a bottom end, wherein the series of electrode tubes consists of alternating anode and cathode tubes;
   a space between adjacent electrode tubes that allows passage of the gas and/or liquid along the length of the electrode tubes;
   a porous inline electrode tube that forms the center of the series of the electrode tubes,
      wherein the porous inline electrode tube is less porous than the series of electrode tubes surrounding the porous inline electrode tube;
   optionally, a top flange and a bottom flange;
   a top end cap on one end of the outside housing and a bottom end cap on the other end of the outside housing;
   an inlet through the bottom end cap and through the optional bottom flange that is in fluid communication with the inline electrode tube;
   an outlet through the top end cap and through the optional top flange that is in fluid communication with the inline electrode tube.

2. The apparatus of claim 1, wherein the electrode tubes comprise titanium.

3. The apparatus of claim 1, wherein the anode tubes are made of titanium mesh.

4. The apparatus of claim 1, wherein the cathode tubes are made of mixed metal oxide coated titanium mesh.

5. The apparatus of claim 1, wherein the mixed metal oxide coated titanium mesh is coated with $RuO_2$, $IrO_2$, $PtO_2$, or a mixture thereof.

6. The apparatus of claim 1, wherein the top end cap and/or the bottom end cap includes one or more passageways for securing an electrical connection to each of the electrode tubes.

7. The apparatus of claim 1, further comprising a gasket between the top flange and the top end cap and a gasket between the bottom flange and bottom end cap.

8. The apparatus of claim 1, wherein the outside housing functions as an anode.

9. The apparatus of claim 8, wherein the outside housing is a concentric tube.

10. The apparatus of claim 1, wherein the space between adjacent electrode tubes is about 1 mm to about 2 meters.

11. The apparatus of claim 1, wherein the electrode tubes are essentially cylindrical.

12. The apparatus of claim 1, wherein the top endcap comprises a series of slots that receive the top end of each of the electrode tubes and the bottom endcap comprises a series of slots that receive the bottom end of each of the electrode tube, thereby retaining in place the series of electrode tubes such that each of the electrode tubes of the series is substantially parallel to all other electrode tubes of the series.

13. The apparatus of claim 1, wherein the top end cap and the bottom end cap are made of material that is substantially non-conductive such that the top end cap and bottom end cap function as electrical isolators between the series of electrode tubes and an outer housing that houses the series of electrode tubes.

14. The apparatus of claim 1, wherein the bottom endcap and/or the top endcap comprises a secondary outlet coupled to a pressure relief valve for alleviating pressure build up in the apparatus, wherein the pressure relief valve may optionally be in communication with a carbon filter.

15. The apparatus of claim 1, wherein the space between adjacent electrode tubes is substantially the same between all adjacent electrode tubes in the series of electrode tubes.

16. A method for treating gas comprising:
   feeding a gas and/or liquid comprising $H_2S$, FeS, and NaCl into the inlet of the apparatus of claim 1;
   applying a power source to the apparatus, which converts NaCl into $O_3$, $Cl^-$, $ClO_2$ and $H_2O_2$, which react with the $H_2S$ and FeS, thereby reducing the amount of $H_2S$ and FeS in the gas and/or liquid.

17. The method of claim 16, wherein the gas and/or liquid comprises sulfate reducing bacteria and applying the power source to the apparatus lysis the sulfate reducing bacteria.

18. The method of claim 17, wherein the gas and/or liquid is petroleum wastewater and/or natural gas.

* * * * *